US007864831B2

(12) United States Patent
Abou Rjeily

(10) Patent No.: US 7,864,831 B2
(45) Date of Patent: Jan. 4, 2011

(54) COHERENT COOPERATIVE UWB COMMUNICATION SYSTEM

(75) Inventor: Chadi Abou Rjeily, Zahle (LB)

(73) Assignee: Commissariat a l'Energie Atomique, Paris (FR)

(*) Notice: Subject to any disclaimer, the term of this patent is extended or adjusted under 35 U.S.C. 154(b) by 745 days.

(21) Appl. No.: 11/757,622

(22) Filed: Jun. 4, 2007

(65) Prior Publication Data

US 2007/0280333 A1    Dec. 6, 2007

(30) Foreign Application Priority Data

Jun. 6, 2006    (FR) .................................. 06 52034

(51) Int. Cl.
*H04B 1/00* (2006.01)
(52) U.S. Cl. ..................................... 375/130
(58) Field of Classification Search ................. 375/130, 375/239, 259, 265, 285; 370/213, 315
See application file for complete search history.

(56) References Cited

U.S. PATENT DOCUMENTS

| 7,289,494 | B2* | 10/2007 | Lakkis .................. 370/366 |
| 7,321,601 | B2* | 1/2008 | Rogerson et al. .......... 370/478 |
| 7,379,447 | B2* | 5/2008 | Dunagan et al. .......... 370/350 |
| 7,594,010 | B2* | 9/2009 | Dohler et al. ............. 709/224 |

OTHER PUBLICATIONS

Sheng Yang, et al., "Optimal Space-Time Codes for the Mimo Amplify-and-Forward Cooperative Channel", International Zurich Seminar on Communications (IZS), XP 010924253, Feb. 22-24, 2006, pp. 122-125.
Chadi Abou-Rjeily, et al., "Space-Time Coding for Multiuser Ultra-Wideband Communications", Internet Citation, http://www.comelec.enst.fr/, Draft, XP 002407955, Sep. 13, 2005, pp. 1-25.
G.V.V. Sharma, et al., "Diversity Gain Using a Repeater in a Wireless Personal Area Network", Vehicular Technology Conference, XP 010855676, May 30, 2005, pp. 1519-1522.

(Continued)

*Primary Examiner*—Khanh C Tran
(74) *Attorney, Agent, or Firm*—Oblon, Spivak, McClelland, Maier & Neustadt, L.L.P.

(57) ABSTRACT

A distributed space-time coding method for a UWB pulse telecommunication system, wherein a source terminal transmits a signal to a destination terminal during a transmission interval constituted by K frames, $K \geq 1$, each frame being divided into a first and a second half-frame, the signal transmitted in each first half-frame being received, then retransmitted after amplification during the next second half-frame by a distinct relay terminal among K relay terminals of the system. The source terminal codes 4K data symbols belonging to a PPM modulation alphabet or a composite PPM-PAM modulation alphabet including a plurality of time positions, to provide a sequence of four transmission symbols per frame, the transmission symbols being obtained from 4K linear combinations of the data symbols using a plurality of coefficients belonging to a real algebraic extension of degree 2K of the field of rational numbers and, for one of the transmission symbols, a permutation of its PPM components.

20 Claims, 5 Drawing Sheets

OTHER PUBLICATIONS

Joseph Thomas, "Efficient Distributed Signaling Schemes for Cooperative Wireless Networks", Vehicular Technology Conference, XP 010786776, Sep. 26, 2004, pp. 1018-1022.

Kambiz Azarian, et al., "On Th Achievable Diversity-Multiplexing Tradeoff in Half-Duplex Cooperative Channels", IEEE Transactions on Information Theory, vol. 51, No. 12, Dec. 2005, pp. 4152-4172.

Chadi Abou-Rjeily, et al., "Distributed Algebraic Space Time Codes for Ultra Wideband Communications", Draft, Oct. 25, 2005, pp. 1-17.

Neiyer S. Correal, et al., "An UWB Relative Location System", www.ee.vt.edu., Nov. 2003, 4 Pages.

* cited by examiner

COHERENT COOPERATIVE UWB COMMUNICATION SYSTEM

TECHNICAL FIELD

This invention relates both to the field of ultra-wide band (or UWB) telecommunications and that of cooperative telecommunication systems.

PRIOR ART

UWB telecommunication systems have been the subject of considerable research in recent years. These systems are characterised in that they work directly in the baseband on so-called ultra-wide band signals. The term UWB signal is generally used to refer to a signal consistent with the spectral mask stipulated in the regulations of the FCC of Feb. 14, 2002, revised in March 2005, i.e. essentially a signal in the spectral band 3.1 to 10.6 GHz and having a bandwidth of at least 500 MHz to −10 dB. UWB signals are divided into two categories: multi-band OFDM (MB-OFDM) signals and UWB pulse signals. A UWB pulse signal is constituted by very short pulses, on the order of several hundred picoseconds to a nanosecond. Below, we will limit ourselves to UWB pulse systems.

UWB systems are suitable candidates for wireless personal networks (WPAN). In a conventional wireless network, such as a cellular telecommunication network, the connections are established between a transmitter and a receiver, without the participation of third-party terminals. To improve the spatial coverage of wireless networks, ad hoc architectures implementing strategies for cooperation between terminals have been proposed.

FIG. 1 very schematically shows a strategy for cooperation in such a network. The source terminal s transmits a data stream to a destination terminal d. The terminal r also receives the data stream sent by s and relays it to the destination terminal d. The terminal r thus cooperates in the transmission of data between s and d. For example, if the channel s-d is of low quality, in particular due to the presence of an obstacle between s and d, the channel s-r-d can make it possible to bypass it and obtain a satisfactory quality. The data stream can be relayed by a plurality of terminals in order to further increase the spatial diversity of the transmission paths. In addition, it can be relayed in a single hop (single-hop) or in a plurality of consecutive hops (multiple-hop).

As is known, in a TDMA wireless network, each terminal has a transmission interval dedicated to it. Two cooperation modes are thus distinguished: parallel cooperation and serial cooperation.

In a parallel cooperation mode, the relay terminal receives the data from the source terminal during the transmission interval allocated to the latter and retransmits it to the destination terminal during its own transmission interval. The destination terminal thus receives the same data, via different routing paths, once during the transmission interval of the source terminal and a second time during the transmission interval of the relay terminal. Although the term parallel may seem to be inappropriate due to the sequential reception of the data by the destination terminal, it in fact signifies the absence of interference between the two routing paths, resulting from the time separation of the transmission intervals of the source terminal and the relay terminal. Operation in parallel cooperation mode assumes that the relay terminal does not have any specific data to be transmitted during its transmission interval. This considerably reduces the cooperation configurations.

In a serial cooperation mode, the relay terminal receives and retransmits the data from the source terminal during the transmission interval allocated to the latter. To do this, it can simply retransmit, after amplification, the signal received (so-called AF protocol for Amplify and Forward) or it can first decode the signal before retransmitting it (so-called Decode and Forward protocol). The destination terminal receives the data from the source terminal, via different routing paths, during the transmission interval allocated to the source terminal.

A cooperative system using in particular an AF protocol is described in the article of K. Azariam et al. entitled "On the achievable diversity-multiplexing tradeoff in half-duplex cooperative channels", published in IEEE Trans. on Information Theory, Vol. 51, N° 12, December 2005, pages 4152-4172.

Due to the simultaneous transmission of data by the source terminal and data of this same terminal relayed by the relay terminal, the data must be coded so as to ensure its orthogonality. This code is called a distributed space-time code or DSTC.

Cooperative telecommunication systems are, like so-called MIMO (Multiple In Multiple Out) multi-antenna systems, systems with transmission spatial diversity. The type of detection used in the receiver depends on the information available on the channel. The following are distinguished:

so-called coherent systems, in which the receiver knows the characteristics of the transmission channel, typically by an estimation of the channel performed using pilot symbols transmitted by the transmitter. The channel estimation is then used to detect data symbols. Coherent systems are generally intended for high-speed applications;

non-coherent systems, in which the receiver performs a blind detection of the data symbols, without prior knowledge of the characteristics of the transmission channel;

differential systems, in which the data symbols are coded in the form of phase or amplitude differences on two consecutive transmission symbols. These systems may not require knowledge of the channel on the receiver side.

A first example of a coherent cooperative system using an AF protocol is known from the article of S. Yang and J-C Belfiore entitled "Optimal space-time codes for the MIMO amplify-and-forward cooperative channel" available at the site www.comelec.enst.fr. This article also proposes a generalisation of the cooperative system of the article of K. Azariam to the case in which the sources, relays and destination are, of the multi-antenna type. The system described has a high coding gain, and therefore good BER performance. However, it is not applicable to UWB signals. Indeed, the system in question uses DSTC codes with complex coefficients, which therefore have phase data. However, given the very short duration of the pulses used, and consequently the bandwidth of the UWB signals, it is excessively difficult to extract phase data from them.

A second example of a coherent cooperative system using an AF protocol is known from the article of C. Abou-Rjeily et al. entitled "Distributed algebraic space time codes for ultra wideband communications", submitted for publication, Kluwer publications. Unlike the first one, this system uses real DSTC code coefficients and UWB signals. However, its BER performance is inferior to that of the previous system.

The objective of the invention is to propose a coherent cooperative system, using UWB signals while exhibiting a higher coding gain that that of the prior art.

DESCRIPTION OF THE INVENTION

This invention is defined by a distributed space-time coding method for a UWB pulse telecommunication system in which a source terminal transmits a signal to a destination terminal during a transmission interval constituted by K frames, $K \geq 1$ each frame being divided into a first and a second half-frame, the signal transmitted in each first half-frame being received, then retransmitted after amplification during the next second half-frame by a distinct relay terminal among K relay terminals of said system. Said source terminal codes 4K data symbols belonging to a PPM modulation alphabet or a composite PPM-PAM modulation alphabet including a plurality of time positions, so as to provide a sequence of four transmission symbols per frame, said transmission symbols being obtained from 4K linear combinations of said data symbols using a plurality of coefficients belonging to a real algebraic extension of 2K of the field of rational numbers and, for one of said transmission symbols of predetermined rank in said sequence of each frame, a permutation of its PPM components. The transmission symbols thus obtained modulate a UWB pulse signal.

The invention is also defined by a coding device for a UWB pulse telecommunication terminal intended to transmit a signal to a destination terminal during a transmission interval (TTI) constituted by K frames, $K \geq 1$, wherein said coding device includes:

first distribution means for providing 4K data symbols belonging to a composite PPM-PAM modulation alphabet including M time positions, with K parallel coding modules, each coding module corresponding to a frame and operating on said 4K data symbols so as to provide four transmission symbols;

seconds distribution means for providing each coding module with a set of 4K coefficients $(V^K, V_1^K)$ belonging to a real algebraic extension of the field of rational numbers;

each coding module being suitable for performing a linear combination of said 4K data symbols by means of the 4K coefficients that it receives, and for performing a permutation of the PPM components of one of the symbols obtained by combination;

a plurality of series-mounted delay lines, each applying a delay equal to the frame duration and receiving, at its input, the output of a coding module.

BRIEF DESCRIPTION OF THE DRAWINGS

Other features and advantages of the invention will appear on reading about a preferred embodiment of the invention, in reference to the appended figures, wherein.

DETAILED DESCRIPTION OF SPECIFIC EMBODIMENTS

The basic idea of the invention is to use a cooperation strategy using UWB pulse signals modulated by a position and amplitude modulation or PPM-PAM (Pulse Position Modulation & Pulse Amplitude Modulation) and to make sure that the orthogonality is maintained between the signal to be relayed and the signal relayed by means of a specific type of coding.

Figure 1:
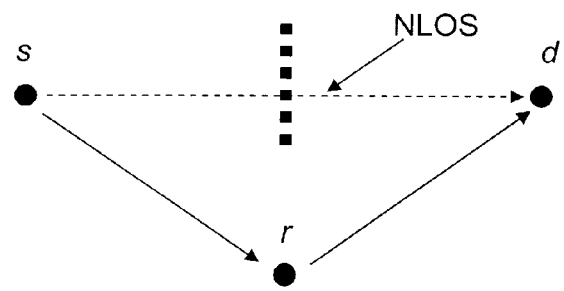
FIG. 1 diagrammatically shows a strategy for cooperation in a wireless network.
Figure 2:
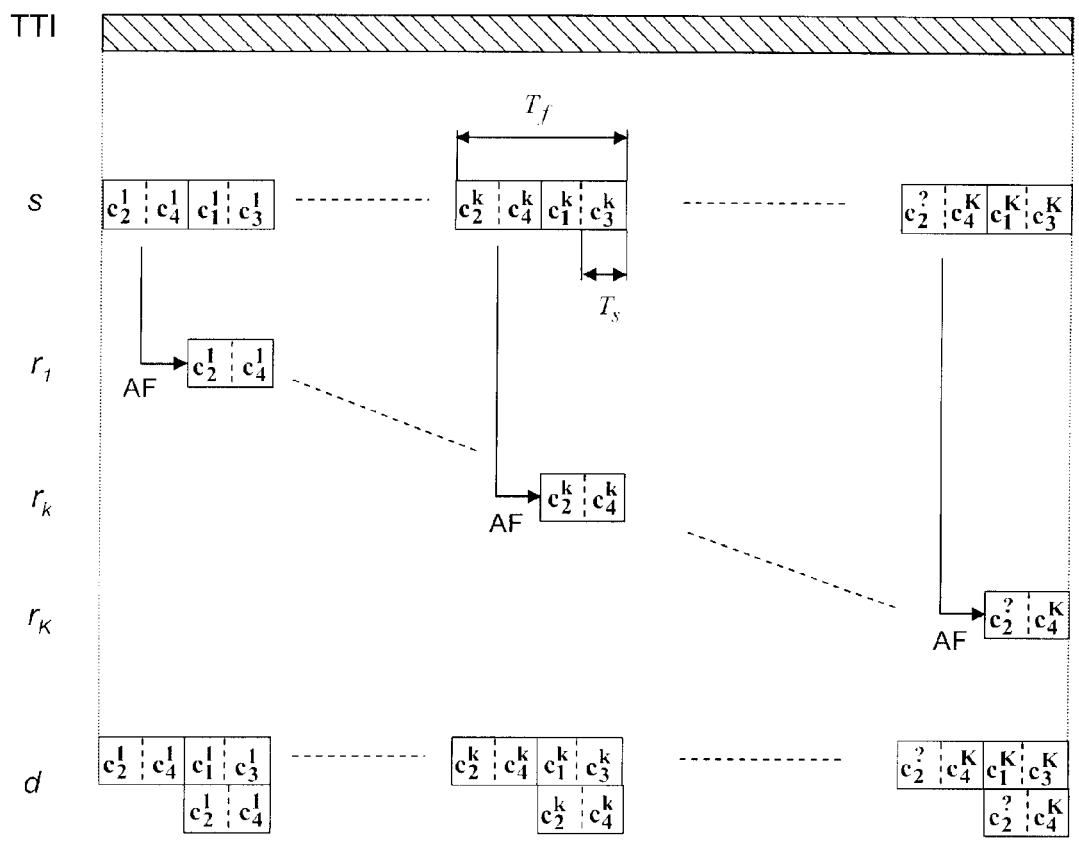
FIG. 2 diagrammatically shows a protocol for cooperation according to a preferred embodiment using a plurality of relay terminals.

The cooperation strategy used is the AF type, as shown in FIG. 2. In this case, we will consider a source terminal s, K relay terminals $r_1, r_2, \ldots, r_K$ with $K \geq 1$, and a destination terminal d. The transmission interval denoted by TTI is allocated to the source terminal s. In other words, during this time window, only the source terminal s can transmit, with the relays $r_1, r_2, \ldots, r_K$ being limited to relaying the signal transmitted by the source terminal.

The signal transmitted by the source terminal in the TTI window is constituted by a sequence of K frames, each having a duration $T_f$ and constituted by two half-frames. If we consider, for example, the $k^{th}$ frame of the sequence, its first half-frame is relayed by the relay terminal $r_k$ while the source transmits its second half-frame. Thus, the first half-frame of each frame of the sequence is relayed by a different relay terminal.

A transmission interval TTI makes it possible to transmit 4K data symbols, with each of the K frames providing a spatial diversity of 2 (source and relay terminals). More specifically, 4K data symbols denoted by $s_1, s_2, \ldots, s_{4K}$ are coded in 4K transmission symbols $c_1^k, c_2^k, c_3^k, c_4^k$, $k=1, \ldots, K$, wherein the code is not degenerated and has rank 4K.

Figure 3:
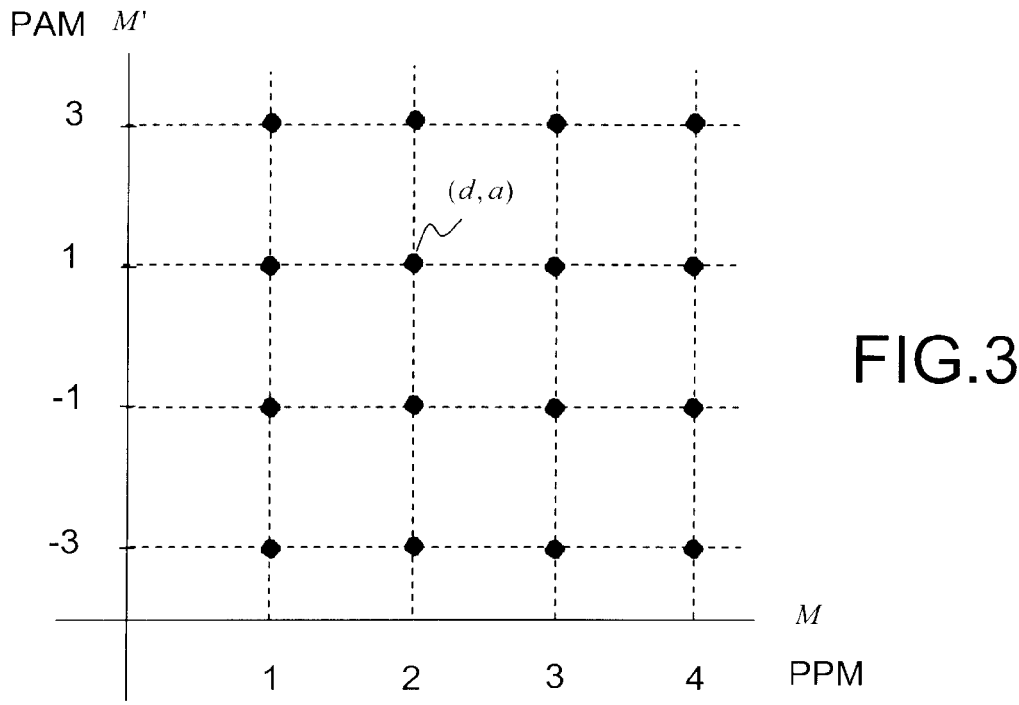
FIG. 3 shows an example of a PPM-PAM modulation alphabet.

The data symbols $s_1, s_2, \ldots, s_{4K}$ are elements of a M-PPM-M'-PAM or a M-PPM modulation alphabet, the latter alphabet being considered for the purposes of the description as a specific case of the first, with M'=1. The alphabet of this cardinal modulation M.M' has been shown diagrammatically in FIG. 3. For each of the M time positions, M' modulation amplitudes are possible. An alphabet symbol can be represented by a vector $a=(\alpha_1, \ldots, \alpha_M)^T$ of dimension M with $\alpha_m = \delta(m-d)\alpha$ where d is a position of the PPM modulation and $\alpha$ is an amplitude of the PAM modulation and $\delta(.)$ is the Dirac distribution. Thus, the data symbols will hereinafter be considered to be vectors of M PPM components, of which a single one is non-zero and equal to an element of the PAM alphabet.

Returning to FIG. 2, it is noted that the source terminal transmits the symbols $c_2^k, c_4^k$ during the first half-frame of the $k^{th}$ frame, then the symbols $c_1^k, c_3^k$ during the second half-frame. The relay terminal $r_k$ receives the symbols $c_2^k, c_4^k$ during the first half-frame and retransmits them during the second half-frame. Thus, during the second half-frame, disregarding the propagation time, the destination terminal receives four transmission symbols that can be represented in the form of a space-time code matrix $C^k$ of dimension 2M×2:

$$C^k = \begin{pmatrix} c_1^k & c_2^k \\ c_3^k & c_4^k \end{pmatrix} \quad (1)$$

The time dimension is given by the different rows of the matrix (vertical direction) and the space dimension is (source terminal and relay terminal) is given by the different columns (horizontal directions).

According to the invention, the space-time code matrix $C^k$ is obtained from the data symbols $s_1, s_2, \ldots, s_{4K}$, as follows:

$$c_1^k = \sum_{i=1}^{K} v_i^k s_i + \theta \sum_{i=1}^{K} v_i^k s_{K+i} \tag{2}$$

$$c_2^k = \sum_{i=1}^{K} v_i^k s_{2K+i} + \theta \sum_{i=1}^{K} v_i^k s_{3K+i} \tag{3}$$

$$c_3^k = \Omega \left( \sum_{i=1}^{k} v_i^k s_{2K+i} + \theta_1 \sum_{i=1}^{K} v_i^k s_{3K+i} \right) \tag{4}$$

$$c_4^k = \sum_{i=1}^{K} v_i^k s_i + \theta_1 \sum_{i=1}^{K} v_i^k s_{K+i} \tag{5}$$

where the coefficients $v_i^k$, $i=1, \ldots, K$ are scalars, of which the properties will be provided below, $\theta$ and $\theta_1$ are the conjugated roots of a polynomial $P(X)$ of degree 2, irreducible on the field Q of the rational numbers, and with a strictly positive discriminant. The roots $\theta$ and $\theta_1$ are therefore real and distinct. Advantageously, $P(X)=X^2-X-1$ will be taken as polynomial, in which case $\theta$ is the golden number $$\theta = \frac{1+\sqrt{5}}{2} \text{ and } \theta_1 = \frac{1-\sqrt{5}}{2}.$$

In the expression (4), $\Omega$ is a permutation matrix (circular or not), of dimension M×M, not reducing to a simple transposition. A permutation is any bijective application of the ordered set $\{1, \ldots, M\}$ onto itself, with the exception of the identity. A circular permutation $\omega$ is defined by the relation $\omega(m)=m+q(\bmod M)$ where q is an integer such that $0<q\leq M-1$. For example, for $M\geq 3$, $\Omega$ can be a simple circular shift:

$$\Omega = \begin{pmatrix} 0_{1 \times M-1} & 1 \\ I_{M-1 \times M-1} & 0_{M-1 \times 1} \end{pmatrix} = \begin{pmatrix} 0 & 0 & \cdots & 0 & 1 \\ 1 & 0 & \cdots & 0 & 0 \\ 0 & 1 & 0 & \ddots & \vdots \\ \vdots & \ddots & \ddots & \ddots & 0 \\ 0 & \cdots & 0 & 1 & 0 \end{pmatrix} \tag{6}$$

where $I_{M-1 \times M-1}$ is the identify matrix of size M−1, $0_{1 \times M-1}$ is the zero row vector of size M−1, $0_{M-1 \times 1}$ is the zero column vector of size M−1. More generally, the matrix $\Omega$ can be that of a permutation associated with a change in sign of any one or a plurality of its elements. Thus, in the case of the example provided in (6), the matrices:

$$\Omega = \begin{pmatrix} 0 & 0 & \cdots & 0 & \chi_0 \\ \chi_1 & 0 & \cdots & 0 & 0 \\ 0 & \chi_2 & 0 & \ddots & \vdots \\ \vdots & \ddots & \ddots & \ddots & 0 \\ 0 & \cdots & 0 & \chi_{M-1} & 0 \end{pmatrix} \tag{7}$$

with $\chi_i = \pm 1$ can also be used in the expression (4). For $$M=2, \Omega = \begin{pmatrix} 0 & 1 \\ -1 & 0 \end{pmatrix} \text{ or } \Omega = \begin{pmatrix} 0 & -1 \\ 1 & 0 \end{pmatrix}$$

is taken.

It is understood from expressions (2) to (5) that the transmission symbols $c_1^k, c_2^k, c_3^k, c_4^k$ are, like the data symbols $s_1, s_2, \ldots, s_{4K}$, vectors of dimension M of which each component corresponds to a modulation position. Indeed, they are obtained by a simple linear combination of the data symbols, and, for $c_3^k$ by an additional operation, namely a permutation of the PPM components, possibly combined with a sign inversion of some of them.

In general, the scalar coefficients $v_i^k$, $i=1, \ldots, K$ are elements of a real (non-complex) algebraic extension of order K of the field Q of the rational numbers. In other words, the scalar coefficients $v_i^k$ are the real roots of a polynomial $Q^k[X]$ of degree K, with coefficients in Q and irreducible on Q. The polynomial $Q^k[X]$ is chosen so as to be prime with $P[X]$, and then the scalar coefficients $v_i^k$, $\theta v_i^k$, $\theta_1 v_i^k$ intervening in the expressions (2) to (5) are elements of an iterated algebraic extension, also real, $F:Q[\theta]$ of degree 2 over $Q[\theta]$ and consequently of degree 2K over Q, where $Q[\theta]$ is the algebraic extension of Q obtained by introducing the root $\theta$ of $P[X]$. According to the expressions (2) to (5), the components of vectors $c_1^k, c_2^k, c_3^k, c_4^k$ also belong to the algebraic extension F.

The expressions (2) to (5) can be written in a more compact matrix form:

$$C^k = \begin{pmatrix} (V^k \sigma_{12})^T & (V^k \sigma_{34})^T \\ \Omega(V_1^k \sigma_{34})^T & (V_1^k \sigma_{12})^T \end{pmatrix} \tag{8}$$

where $V^k=(v^k, \theta v^k)$, $v_1^k=(v^k, \theta_1 v^k)$ with $v^k=(v_1^k, v_2^k, \ldots, v_K^k)$ is defined as the row vector of the scalar coefficients and:

$$\sigma_{12}=(s_1, \ldots, s_K, s_{K+1}, \ldots, s_{2K})^T; \sigma_{34}=(s_{2K+1}, \ldots, s_{3K}, s_{3K+1}, \ldots, s_{4K})^T;$$

in other words, $\sigma_{12}$ is a matrix of dimension 2K×M combining the 2K first data symbols and $\sigma_{34}$ is a matrix of the same dimension combining the next 2K symbols. It is noted that the data symbols are column vectors of dimension M.

The transmission symbols $c_1^k, c_2^k, c_3^k, c_4^k$ $k=1, \ldots, K$ of the space-time code serve to modulate a UWB signal in position and amplitude. More specifically, each half-frame is divided into two symbol times of duration $T_s=T_f/4$, and a transmission symbol is transmitted for each symbol time. Each symbol time provides M modulation positions $\tau_1, \tau_2, \ldots, \tau_M$ advantageously but not necessarily equally distributed in the latter. If $c=(c(1), c(2), \ldots, c(m))^T$ is a transmission symbol, the signal transmitted by the source terminal during the corresponding symbol time is then expressed simply by:

$$c(t) = \sum_{m=1}^{M} c(m) w(t - \tau_m) \tag{9}$$

where w(t) is the basic form of the UWB pulse. Its time support is chosen to be substantially lower than the interval $|\tau_{m+1}-\tau_m|$ between successive modulation positions.

The modulation positions are identical for the symbols of a same frame. They can however differ from one frame to another. It is also noted that the modulation positions can be identical for all of the source terminals, with the orthogonality being ensured in this case by TDMA multiplexing. Therefore, it is not necessary to separate them by means of time-hopping sequence as in a conventional TH-UWB (Time-Hopping UWB) sequence or by multiplication by orthogonal sequences as in a DS-UWB (Direct Spread UWB) system. However, the position modulation can serve to modulate a TH-UWB, a DS-UWB or even a TH-DS-UWB signal, if a plurality of source terminals are authorised to simultaneously access during the same interval TTI. Thus, in general, the signal transmitted during a symbol time can have the following form:

$$c(t) = u(t) \otimes \sum_{m=1}^{M} c(m)\delta(t - \tau_m) \quad (9')$$

where u(t) is a UWB pulse signal, for example TH-UWB, DS-UWB, or TH-DS-UWB. Below, we will limit ourselves for simplification purposes, but without prejudice of generality, to a source signal having the form of expression (9).

The source terminal s transmits, in the second half-frame of the $k^{th}$ frame, the signal:

$$c_1^k(t) = A_S \sum_{m=1}^{M} \sum_{i=1}^{K} v_i^k [s_i(m) + \theta s_{K+i}(m)] w(t - \tau_m) \quad (10)$$

during the first symbol time, and $$c_3^k(t) = A_S \sum_{m=1}^{M} \sum_{i=1}^{K} v_i^k \chi_m [s_{2K+i}(\omega(m)) + \theta_1 s_{3K+i}(\omega(m))] w(t + T_s - \tau_m) \quad (11)$$

during the second symbol time, where $\omega$ is a permutation of the ordered set $\{1, 2, \ldots, M\}$, $\chi_m = \pm 1$ and $A_s$ is a coefficient function of the transmission power of the source terminal.

Simultaneously, in the second half-frame of the $k^{th}$ frame, the relay $r_k$ retransmits the signal:

$$c_2^k(t) = \alpha_k A_s h_{sr}^k \sum_{m=1}^{M} \sum_{i=1}^{K} v_i^k [s_{2K+i}(m) + \theta s_{3K+i}(m)] w(t - \tau_m) \quad (12)$$

during the first symbol time, where $h_{sr}^k$ is the attenuation coefficient of the propagation path between the source terminal and the relay terminal $r_k$ and $\alpha_k$ is the amplification gain of the relay $r_k$; and $$c_4^k(t) = \alpha_k A_s h_{sr}^k \sum_{m=1}^{M} \sum_{i=1}^{K} v_i^k [s_i(m) + \theta_1 s_{K+i}(m)] w(t + T_S - \tau_m) \quad (13)$$

during the second symbol time.

Below, we will give the vectors $v^k$ that correspond to the best coding gain for $$\theta = \frac{1 + \sqrt{5}}{2},$$

for low values of K.

For a single relay, the vectors $v^k$ are reduced simply to the scalar value V=1.

For two relays, the components of the vectors $v^k$ are advantageously chosen to be equal to:

$$v_1^k = \frac{\sqrt{3 - \phi_k}}{2} \text{ and } v_2^k = \frac{\sqrt{3 - \phi_k}}{2} \phi_k \text{ with } \phi_1 = 1 + \sqrt{2} \text{ and } \phi_2 = 1 - \sqrt{2}.$$

For three relays, the components of the vectors $v^k$ are advantageously chosen to be equal to:

$$v_1^k = \frac{-2 + 2\phi_k + 3\phi_k^2}{7}; v_2^k = \frac{6 + \phi_k - 2\phi_k^2}{7}; v_3^k = \frac{3 - 3\phi_k - \phi_k^2}{7};$$

$$\text{with } \phi_k = 2\cos\left(\frac{2\pi k}{7}\right).$$

For four relays, the components of the vectors $v^k$ are advantageously chosen to be equal to:

$$v_1^k = \sqrt{\frac{2 + 3\phi_k - \phi_k^2}{8}}; v_2^k = \sqrt{\frac{2 - \phi_k}{8}}; v_3^k = \sqrt{\frac{2 - 3\phi_k + \phi_k^2}{8}};$$

$$v_4^k = \sqrt{\frac{2 + \phi_k}{8}} \text{ with } \phi_k = 2\cos\left(\frac{\pi k}{8}\right).$$

Finally, for five relays, the components of the vectors $v^k$ are advantageously chosen to be equal to:

$$v_1^k = \frac{4 + 2\phi_k + 2\phi_k^2 - \phi_k^3}{11}; v_2^k = \frac{15 - 2\phi_k - 12\phi_k^2 + \phi_k^3 + 3\phi_k^4}{11};$$

$$v_3^k = \frac{6 - 7\phi_k + 4\phi_k^2 + 2\phi_k^3 - \phi_k^4}{11}; v_4^k = \frac{8 + 7\phi_k + 5\phi_k^2 - 3\phi_k^3 - 2\phi_k^4}{11};$$

$$v_5^k = \frac{7 + \phi_k^2 + \phi_k^3}{11} \text{ with } \phi_k = 2\cos\left(\frac{2\pi k}{11}\right).$$

The coefficients $v_i^k$ are defined up to a common multiplication coefficient. Values proportional to these coefficients result in identical performances of the code. It is possible to deviate from this constraint of proportionality at the expense of a degradation in the coding gain. It was demonstrated that a deviation of ±10% of the proportionality did not significantly alter the performance of the space-time code. This tolerance makes it possible in particular to work with quantified coefficients $v_i^k$, such as 8-bit bytes. The performance of the space-time code according to the invention invariant by any permutation of the coefficients $v_i^k$ operating on the indices i and/or k, in other words by any permutation operating simultaneously on the same components of the vectors $v^k$, k=1, . . . , K combined with a possible permutation of these vectors. This can easily be understood by observing that the first permutation is equivalent in the expressions (2), (3), (4), (5) to a permutation of the order in which the data symbols $s_1, \ldots, s_{2K}$ and $s_{2K+1}, \ldots, s_{4K}$ are taken. The second permutation simply amounts to a change in the order of transmission of the frames.

Furthermore, the performance of this code is also invariant by exchanging diagonal and/or anti-diagonal elements of the matrices $C^k$, i.e. by an inversion in the transmitted frames of symbols $c_1^k$ and $c_4^k$ and/or of symbols $c_2^k$ and $c_3^k$. In other words, the sequence of symbols transmitted in the $k^{th}$ frame can be: $c_2^k, c_4^k, c_1^k, c_3^k$ or $c_2^k, c_1^k, c_4^k, c_3^k$ or $c_3^k, c_4^k, c_1^k, c_2^k$ or $c_3^k, c_1^k, c_4^k, c_2^k$.

Finally, the inversion of the conjugated roots $\theta$ and $\theta_1$ does not change the code performance either.

Below, we will consider the power control of the source terminal and the relay terminals. The choice of coefficients $A_s$ and $\alpha_k$, i.e. the transmission power $P_s$ of the source terminal and the amplification gains of the various relay terminals can be made according to two distinct modes. It is first assumed that each relay terminal has an open-loop power control maintaining the product $\alpha_k h_{sr}^k$ at a constant power corresponding to a constant transmission power $P_r$, independent of the relay.

According to a first mode, the powers transmitted by the relay terminals are chosen so that their sum complies with the aforementioned FCC spectral mask. In other words, if P is the power value making it possible to comply with the FCC spectral mask, respective powers of the source terminal and the relay terminal are chosen so that the total source and relay power averaged over an interval TTI is equal to P, that is:

$$\frac{(KP_S T_f + KP_r T_f/2)}{KT_f} = P_S + KP_r/2 = P \tag{14}$$

It is thus understood that the first mode can make it possible, for the same BER, to save the power of the source terminal by distributing it between the source and the relays.

According to a second mode, the respective powers of the source terminal and the relay terminals will each comply with the FCC spectral mask. In this case, the total power transmitted is (1+K/2) times that which the source terminal alone would have transmitted. In other words, it is possible to obtain the same BER for a signal-to-noise ratio (1+K/2) times lower than in the first mode of operation or an operation without relay(s).

If the conditions of the channels s-d and $r_k$-d are known, for example the respective attenuation coefficients on these channels, the distribution of power between source and relay terminals according to the first mode can also take into account the attenuation conditions. The respective transmission powers $P_s$ and $P_r^k$ of the terminals s and $r_k$ are then chosen so that:

$$P_s = \alpha_s P \text{ and } P_r^k = \alpha_r^k P \tag{15}$$

where the coefficients $\alpha_s$ and $\alpha_r^k$ verify:

$$a_s + \frac{1}{2}\sum_{k=1}^{K} a_r^k = 1 \tag{16}$$

and are determined for example according to the relative attenuation coefficients $h_{sd}$ and $h_{rd}^k$ with respect to the respective propagation paths s-d and $r_k$-d.

The coefficients $\alpha_s$ and $\alpha_r^k$ can alternatively be determined by closed-loop transmission power control (CL-PC for Closed-Loop Power Control). To do this, power control indications, $TPC_s$ and $TPC_r^k$ (Transmission Power Control) are sent via K+1 return paths to the terminals s and $r_k$. This assumes that there is periodically a separate detection of the direct signal transmitted by the source terminal and the signals relayed by the terminals $r_k$. According to the indications $TPC_s$ and $TPC_r^k$, the terminal s decrements/increments $\alpha_s$ and the terminals increment/decrement $\alpha_r^k$. The indications are determined jointly so that the total budget $$a_s + \frac{1}{2}\sum_{k=1}^{K} a_r^k$$

remains equal to 1.

In an alternative corresponding to an operation according to the second mode, it is possible to have independent indications $TPC_s$ and $TPC_r^k$, wherein the coefficients $a_s$ and $a_r^k$ are no longer related but each remains lower than 1 so as to comply with the spectral mask.

The cooperation strategy described above involves a plurality K of given relay terminals $r_1, r_2, \ldots, r_K$. However, as a general rule, a plurality of terminals may be suitable for the relay function, and it is therefore necessary to choose K terminals from these suitable terminals, before establishing communication between the source terminal and the destination terminal.

According to a first alternative embodiment of the invention, the choice of relay terminals is made by consensus between the source terminal s and the destination terminal d on the basis of a proximity criterion. It is assumed that the terminals can determine the distances that separate them (peer-to-peer ranging) according to conventional pseudo-distance or two-way propagation time calculation means. The UWB signals are highly suitable by virtue of their nature (short time pulses) for a localisation application. There is a description, for example, of a method for calculating distances between UWB terminals in the article of Neiyer S. Correal et al. entitled "An UWB relative location system", available at the site www.ee.vt.edu.

Figure 4:
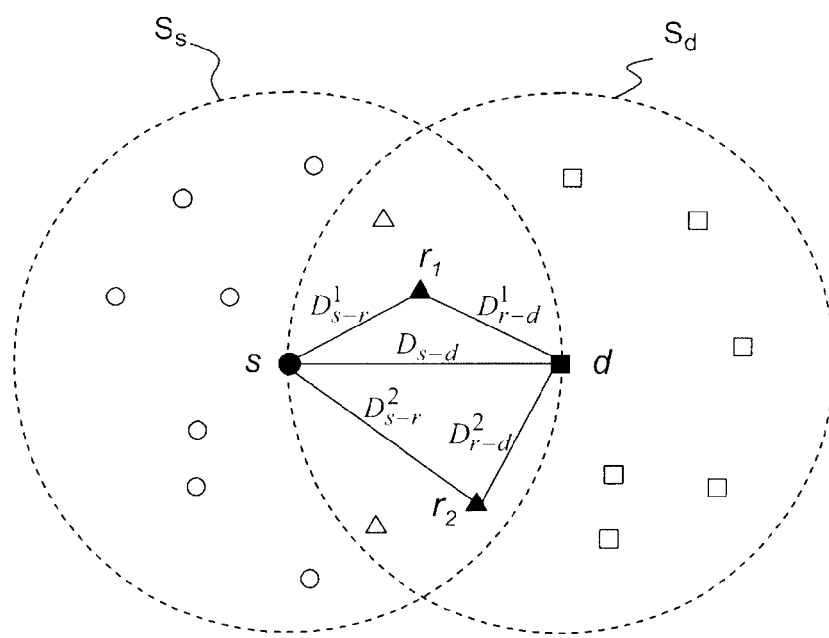
FIG. 4 shows the choice of relay terminals made by consensus between a source terminal and a destination terminal.

FIG. 4 diagrammatically shows the procedure for selecting relay terminals. The terminals s and d first determine the distance $D_{s-d}$ that separates them. The terminal s then determines the set $S_s$ of its close neighbours: to do this, it calculates the distances that separate it from the surrounding terminals and selects those located less than $D_{s-d}$ from it. The terminal d similarly determines the set $S_d$ of its close neighbours. The relay terminals $r_1, r_2, \ldots, r_K$ are selected in the set $S_s \cap S_d$ as those that minimise the sum $D_{s-r}^k + D_{r-d}^k$ where $D_{s-r}^k$ and $D_{r-d}^k$ are the distances between s and $r_k$ and between $r_k$ and d. If the set $S_s \cap S_d$ is empty, the cooperation procedure is abandoned. If the set $S_s \cap S_d$ contains a number K'<K of terminals, a cooperation strategy with K' relays can be adopted after a consensus is made between the source terminal and the destination terminal.

According to a second alternative embodiment, the relay terminals are selected on the basis of an error rate (BER) criterion. To do this, the source terminal transmits a predetermined sequence of control symbols to the surrounding terminals. This sequence is known to all of the terminals, and each terminal that receives it can thus determine its BER. Those of which the BER is lower than a threshold value then send an acknowledgement message to the source terminal, possibly specifying the error rate range measured and/or the load of the terminal. The source terminal selects the relay terminals $r_k$ having reported the lowest BERs.

Figure 5:
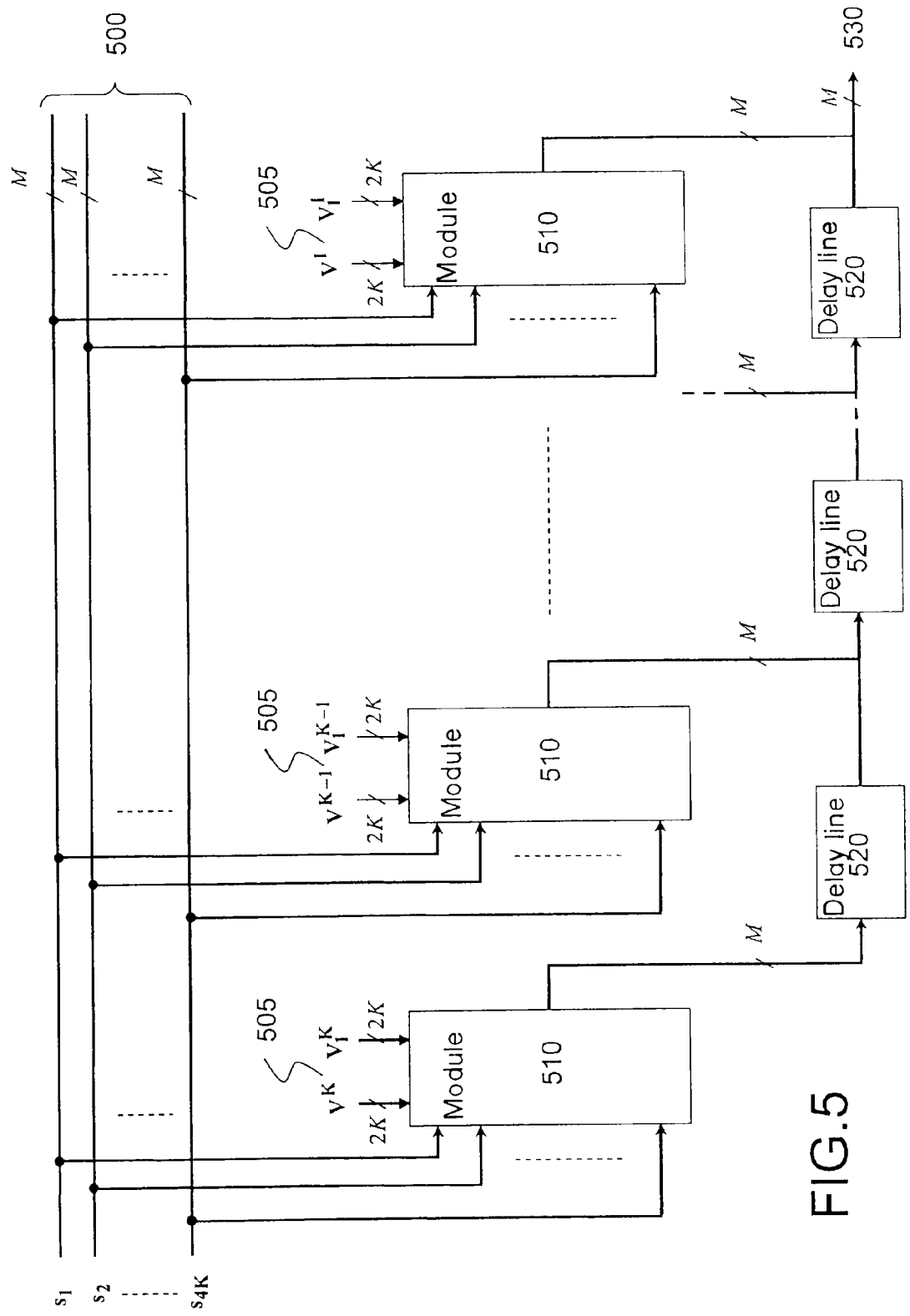
FIG. 5 diagrammatically shows the general structure of a source terminal according to an embodiment of the invention.

FIG. 5 shows the general structure of a source terminal according to an embodiment of the invention.

Reference 500 denotes the bus transporting the 4K data symbols $s_1, s_2, \ldots, s_{4K}$, with each symbol being transported over M wires corresponding to the M components. The source terminal includes K modules 510 operating in parallel on the 4K data symbols, with each module 510 receiving a pair of specific vectors $V^k, V_1^k$, i.e. 4K coefficients, previously stored in a memory, via a second bus 505, not detailed. A module 510 receiving the components of the vectors $V^k, V_1^k$ sequentially provides on its output the transmission symbols of the $k^{th}$ frame in the order $c_2^k, c_4^k, c_1^k, c_3^k$. The outputs of the modules 510, aside from those corresponding to k=1, are applied to K-1 delay lines 520 mounted in series and having a delay value equal to the frame duration $T_f=4T_s$. Each delay line is produced, for example, by means of M shift registers operating in parallel, clocked at the frequency $1/T_s$ and having a length of 4. Thus, the transmission symbols $c_2^1, c_4^1, c_1^1, c_3^1$ of the first frame, then $c_2^2, c_4^2, c_1^2, c_3^2$ of the second frame and so on and so forth, successively appear at the output 530 until $c_2^K, c_4^K, c_1^K, c_3^K$ for the last frame of the transmission interval TTI.

The transmission symbols appearing at the output 530 then serve to modulate a UWB signal as described in relation to the expressions (9) and (9').

Figure 6:
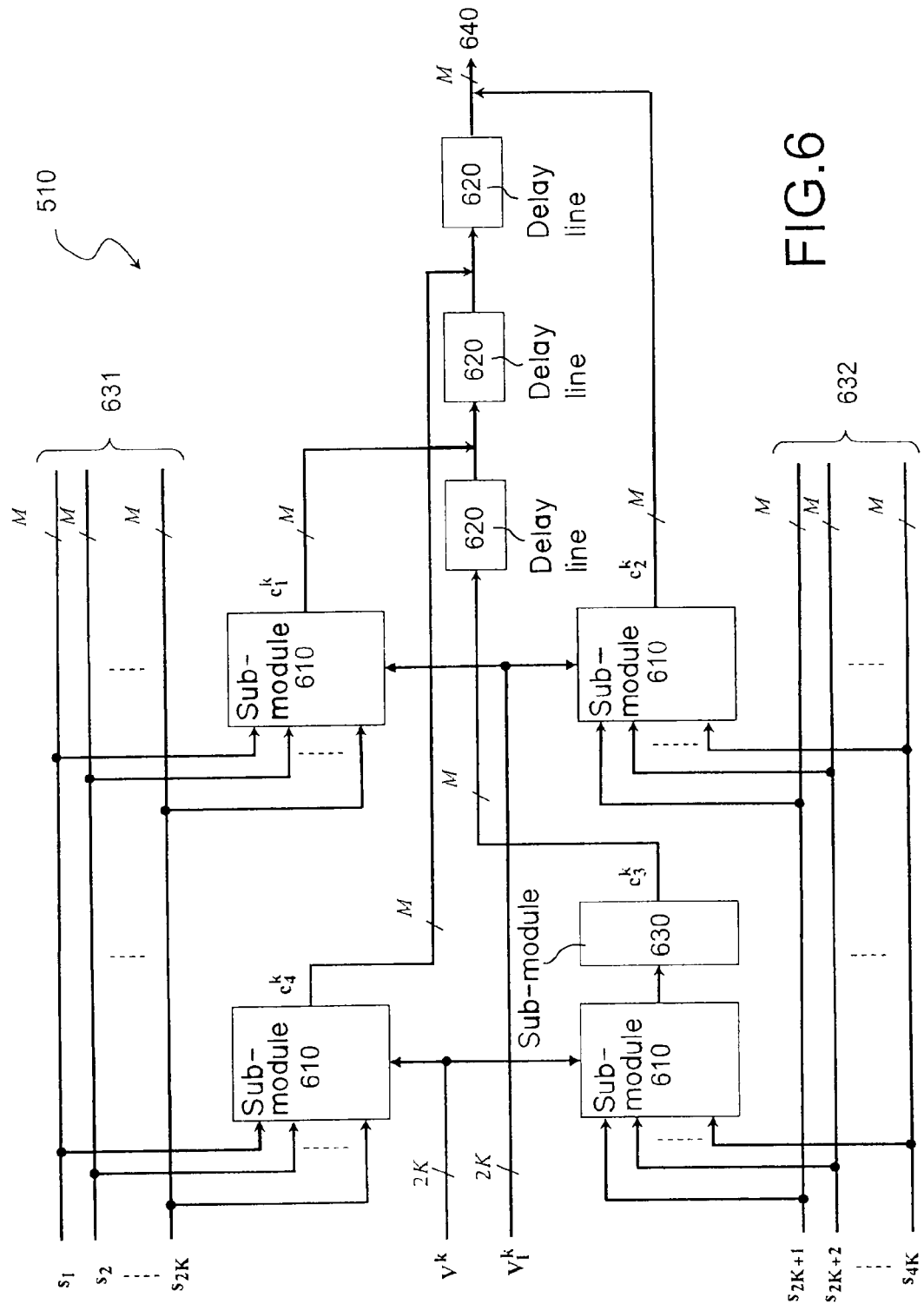
FIG. 6 diagrammatically shows a module of the source terminal shown in FIG. 5.

FIG. 6 shows the general structure of a module 510 of FIG. 5 and more specifically of the module 510 generating the transmission symbols of the $k^{th}$ frame. As already mentioned, this module receives, from the bus 530, the data symbols $s_1, s_2, \ldots, s_{4K}$. For reasons of convenience, the bus is represented in two sub-buses 631 and 632 respectively transporting the symbols $s_1, \ldots, s_K, s_{K+1}, \ldots, s_{2K}$ and $s_{2K+1}, \ldots, s_{3K}, s_{3K+1}, \ldots, s_{4K}$, i.e. $\sigma_{12}$ and $\sigma_{34}$.

The module 510 includes four sub-modules 610 with identical structures, with two of these sub-modules receiving, at the input, the symbols $s_1, \ldots, s_K, s_{K+1}, \ldots, s_{2K}$ and the other two receiving the symbols $s_{2K+1}, \ldots, s_{3K}, s_{3K+1}, \ldots, s_{4K}$. Among the two sub-modules 610 receiving the symbols $s_1, \ldots, s_K, s_{K+1}, \ldots, s_{2K}$, one receives the vector $V^k$ and generates the symbol $c_4^k$, while the other receives the vector $V_1^k$ and generates the symbol $c_1^k$. Similarly, among the two sub-modules 610 receiving the symbols $s_{2K+1}, \ldots, s_{3K}, s_{3K+1}, \ldots, s_{4K}$, one receives the vector $V^k$ and the other receives the vector $V_1^k$. The one receiving the vector $V_1^k$ generates the symbol $c_2^k$. The one receiving the vector $V^k$ generates a symbol of which the PPM components are subjected to a permutation and possibly to a sign change in the sub-module 630. The sub-module 630 generates the symbol $c_3^k$.

The sub-module 610 providing the symbol $c_2^k$ is directly connected to the output 640 and the outputs of the other sub-modules are connected to the respective inputs of three series-mounted delay lines 620, each applying an identical delay equal to the symbol time $T_s$. Thus, the transmission symbols $c_2^k, c_4^k, c_1^k, c_3^k$ appear successively at the output 640 in conformity with the symbol sequence shown in FIG. 2.

Figure 7:
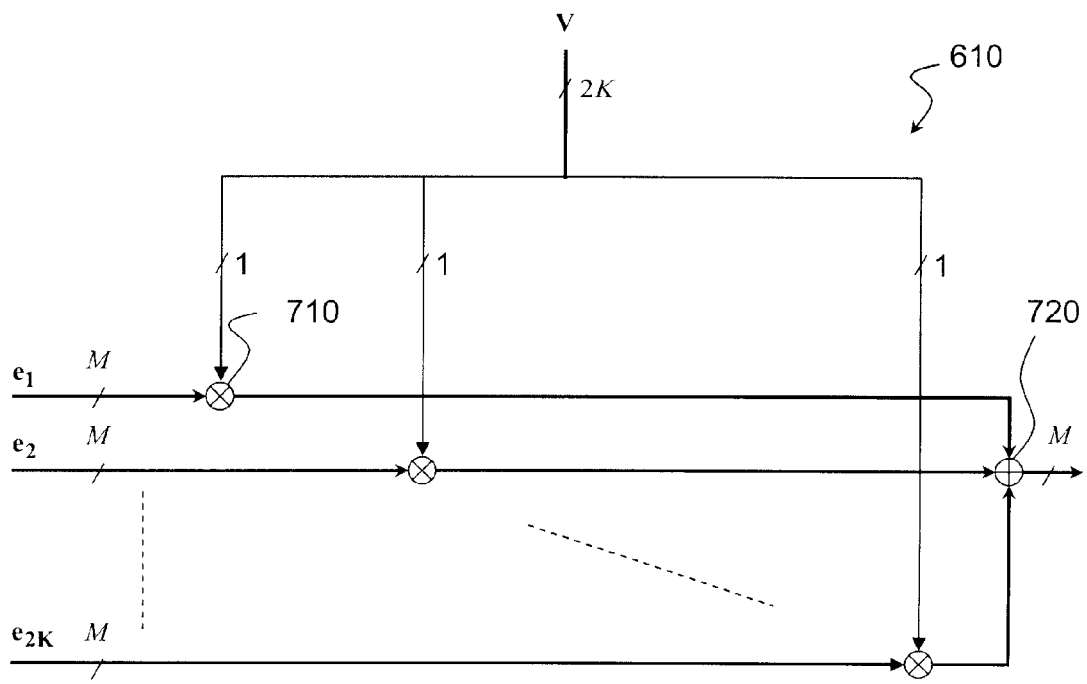
FIG. 7 diagrammatically shows a first sub-module of the module shown in FIG. 6.

FIG. 7 diagrammatically shows the structure of a module 610. It receives, at the input, a vector V with the dimension 2K, for example $V^k$ or $V_1^k$ and 2K vectors $e_1, \ldots, e_K, e_{K+1}, \ldots, e_{2K}$ with the dimension M, for example $s_1, \ldots, s_K, s_{K+1}, \ldots, s_{2K}$ or $s_{2K+1}, \ldots, s_{3K}, s_{3K+1}, \ldots, s_{4K}$. The 2K scalar components of V are respectively multiplied with the vectors $e_1, \ldots, e_K, e_{K+1}, \ldots, e_{2K}$ by means of multipliers 710. The vectors thus obtained are then summed by the summer 720.

Figure 8:
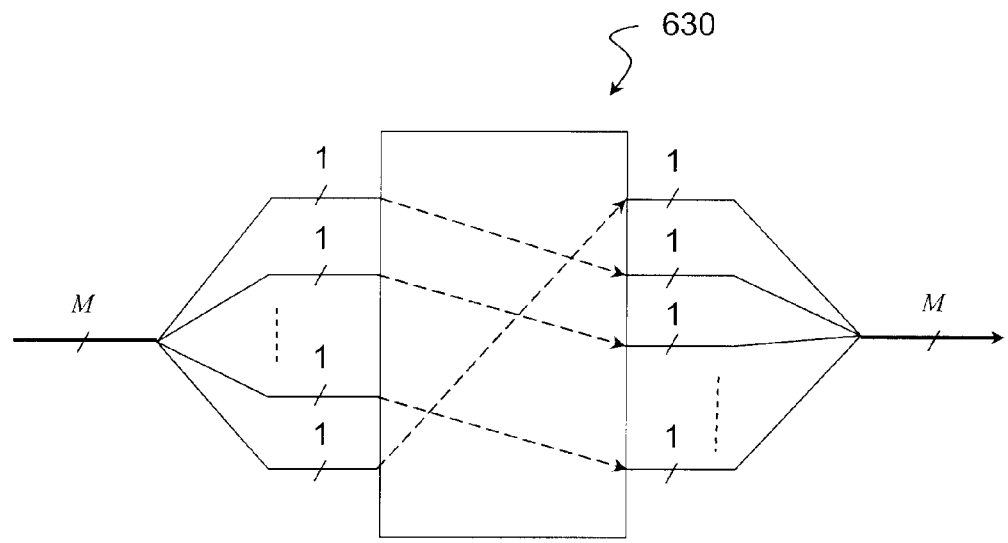
FIG. 8 diagrammatically shows a second sub-module of the module shown in FIG. 6.

FIG. 8 diagrammatically shows the structure of the sub-module 630 of the module 510, according to an embodiment. This sub-module performs the multiplication operation with the matrix $\Omega$, which is a permutation of the M input components, possibly combined with a sign change of one or more of these components. The example shown in FIG. 8 corresponds to a simple circular shift of the components.

The architecture of the source terminal can have numerous alternatives, in particular those caused in the modules 510 by a exchange of transmission symbols $c_1^k$ and $c_4^k$ and/or transmission symbols $c_2^k$ and $c_3^k$ in the space-time code. They involve a branching exchange or branching exchanges at the input of the delay lines 620.

In addition, a person skilled in the art considers that, as the operations in the modules 510 and the sub-modules 610 are identical, it is possible to choose a compromise other than the one proposed, between parallel and serial processing. In particular, it is possible to opt for a massively sequential processing using a single module 610 and/or a single sub-module 510 per sub-module 610, but at the expense of a multiplexing of the data at the input and a demultiplexing of the data at the output, in a manner known to a person skilled in the art.

The UWB signals transmitted by the source terminal during the first half-frames are repeated by the relay terminals in the second half-frames according to a conventional AF protocol. In this regard, the invention does not require a modification of the relay terminals.

Finally, the UWB signals transmitted by the source terminal, retransmitted by the relay terminals, can be processed by a destination terminal in a conventional manner by a MIMO receiver. The receiver can, for example, include a Rake correlation stage followed by a decision stage, using, for example, a sphere decoder known to a person skilled in the art.

The invention claimed is:

1. A distributed space-time coding method in an UWB (ultra-wide band) pulse telecommunication system including a source terminal which transmits a signal to a destination terminal during a transmission interval constituted by K frames, $K \geq 1$, each frame being divided into a first and a second half-frame, the signal transmitted in each first half-frame being received, then retransmitted after amplification during a next second half-frame by a distinct relay terminal among K relay terminals of said system, said method comprising:

coding, by said source terminal, 4K data symbols belonging to a PPM (pulse position modulation) modulation alphabet or a composite PPM-PAM (pulse position modulation-pulse amplitude modulation) modulation alphabet including a plurality of time positions, so as to provide a sequence of four transmission symbols per frame, said transmission symbols being obtained from 4K linear combinations of said data symbols using a plurality of coefficients belonging to a real algebraic extension of 2K of a field of rational numbers and, for one of said transmission symbols of predetermined rank in said sequence of each frame, a permutation of its PPM components; and modulating a UWB pulse signal by the transmission symbols thus obtained.

2. The distributed space-time coding method according to claim 1, wherein the transmission symbol of each frame having undergone a permutation of its PPM components is also subjected to a sign inversion of one or more of its PPM components.

3. The distributed space-time coding method according to claims 1 or 2, wherein the four transmission symbols $c_1^k, c_2^k$, $c_3^k$, $c_4^k$ of a $k^{th}$ frame of the transmission interval are obtained from the 4K data symbols $s_1, s_2, \ldots, s_{4K}$, as follows:

$$c_1^k = \sum_{i=1}^{K} v_i^k s_i + \theta \sum_{i=1}^{K} v_i^k s_{K+i}$$

$$c_2^k = \sum_{i=1}^{K} v_i^k s_{2K+i} + \theta \sum_{i=1}^{K} v_i^k s_{3K+i}$$

$$c_3^k = \Omega \left( \sum_{i=1}^{K} v_i^k s_{2K+i} + \theta_1 \sum_{i=1}^{K} v_i^k s_{3K+i} \right)$$

$$c_4^k = \sum_{i=1}^{K} v_i^k s_i + \theta_1 \sum_{i=1}^{K} v_i^k s_{K+i}$$

where the $v_i^k$, $\theta v_i^k$, $\theta_1 v_i^k$ $i=1,\ldots,K$ are said coefficients; $\theta$ and $\theta_1$ are real conjugated roots of a polynomial of degree 2 irreducible in the field of the rational numbers, $\Omega$ is a permutation operation of the time positions of the PPM-PAM alphabet possibly associated with a sign inversion of one or more PPM components;

wherein the sequence transmitted by the source terminal during said $k^{th}$ frame is $c_2^k, c_4^k, c_1^k, c_3^k$ or $c_2^k, c_1^k, c_4^k, c_3^k$ or $c_3^k, c_4^k, c_1^k, c_2^k$ or $c_3^k, c_1^k, c_4^k, c_2^k$.

4. The distributed space-time coding method according to claim 3, wherein $$\theta = \frac{1+\sqrt{5}}{2} \text{ and } \theta_1 = \frac{1-\sqrt{5}}{2} \text{ or } \theta_1 = \frac{1+\sqrt{5}}{2} \text{ and } \theta = \frac{1-\sqrt{5}}{2}.$$

5. The distributed space-time coding method according to claim 4, wherein K=1 and $v_1^1 = 1$.

6. The distributed space-time coding method according to claim 4, wherein K=2 and:

$$v_1^k = \frac{\sqrt{3-\phi_k}}{2} \text{ and}$$

$$v_2^k = \frac{\sqrt{3-\phi_k}}{2} \phi_k \text{ with } \phi_1 = 1+\sqrt{2} \text{ and } \phi_2 = 1-\sqrt{2}$$

and the coefficients $v_i^k$ are defined up to a permutation on at least one of indices i and k and their values are defined up to a common multiplication coefficient, within ±10%.

7. The distributed space-time coding method according to claim 4, wherein K=3 and:

$$v_1^k = \frac{-2+2\phi_k+3\phi_k^2}{7}; v_2^k = \frac{6+\phi_k-2\phi_k^2}{7};$$

$$v_3^k = \frac{3-3\phi_k-\phi_k^2}{7}; \text{ with } \phi_k = 2\cos\left(\frac{2\pi k}{7}\right),$$

wherein the coefficients $v_i^k$ are defined up to a permutation on at least one of indices i and k and their values are defined up to a common multiplication coefficient, within ±10%.

8. The distributed space-time coding method according to claim 4, wherein K=4 and:

$$v_1^k = \sqrt{\frac{2+3\phi_k-\phi_k^2}{8}}; v_2^k = \sqrt{\frac{2-\phi_k}{8}};$$

$$v_3^k = \sqrt{\frac{2-3\phi_k+\phi_k^2}{8}}; v_4^k = \sqrt{\frac{2+\phi_k}{8}};$$

with $\phi_k = 2\cos\left(\frac{\pi k}{8}\right),$ wherein the coefficients $v_i^k$ are defined up to a permutation on at least one of indices i and k and their values are defined up to a common multiplication coefficient, within ±10%.

9. The distributed space-time coding method according to claim 4, wherein K=5 and:

$$v_1^k = \frac{4+2\phi_k+2\phi_k^2-\phi_k^3}{11}; v_2^k = \frac{15-2\phi_k-12\phi_k^2+\phi_k^3+3\phi_k^4}{11};$$

$$v_3^k = \frac{6-7\phi_k+4\phi_k^2+2\phi_k^3-\phi_k^4}{11}; v_4^k = \frac{8+7\phi_k+5\phi_k^2-3\phi_k^3-2\phi_k^4}{11};$$

$$v_5^k = \frac{7+\phi_k^2+\phi_k^3}{11} \text{ with } \phi_k = 2\cos\left(\frac{2\pi k}{11}\right),$$

wherein the coefficients $v_i^k$ are defined up to a permutation on at least one of indices i and k and their values are defined up to a common multiplication coefficient, within ±10%.

10. The distributed space-time coding method according to claim 1, wherein said permutation of the PPM components is a circular permutation.

11. The distributed space-time coding method according to claim 1, wherein transmission powers of the source terminal and the K relay terminals are chosen so as to be respectively equal to $a_s P$ and $a_r P$, $k=1,\ldots,K$ where P is a power value complying with a UWB spectral mask and where $a_s$ and $a_r^k$ are coefficients such that $0<a_s<1$, $0<a_r^k<1$ and $$a_s + \frac{1}{2}\sum_{k=1}^{K} a_r^k = 1.$$

12. The distributed space-time coding method according to claim 11, wherein the coefficients $a_s$ and $a_r^k$ are determined according to respective conditions of a propagation channel between the source terminal and the destination terminal, and respective channels between said relay terminals and the destination terminal.

13. The distributed space-time coding method according to claim 11, wherein the coefficients $a_s$ and $a_r^k$ are controlled by control loops with K+1 return paths from the destination terminal to the source terminal and the K relay terminals, respectively.

14. The distributed space-time coding method according to claim 1, wherein transmission powers of the source terminal and the relay terminals are each chosen so as to be equal to a power value complying with a UWB spectral mask.

15. The distributed space-time coding method according to claim 1, wherein said K relay terminals are determined by the source and destination terminals by the following steps:

determining a distance separating the source terminal and the destination terminal;

determining a first set of terminals located at less than said distance from the source terminal;

determining a second set of terminals located at less than said distance from the destination terminal; and selecting the K relay terminals from terminals common to said first and second sets, called candidate terminals, as those minimising a sum of distances between the source terminal and a candidate terminal, and between the candidate terminal and the destination terminal.

16. The distributed space-time coding method according to claim 1, wherein said K relay terminals are determined by the source and destination terminals by the following steps:

determining a distance separating the source terminal and the destination terminal;

determining a first set of terminals located at less than said distance from the source terminal;

determining a second set of terminals located at less than said distance from the destination terminal; and determining terminals common to said first and second sets, called candidate terminals, and sending a sequence of predetermined symbols by the source terminal to said candidate terminals, wherein each candidate terminal detects said sequence with an error rate, and the K relay terminals are selected as candidate terminals detecting said sequence with the K lowest error rates.

17. A coding device for a UWB (ultra-wide band) pulse telecommunication terminal intended to transmit a signal to a destination terminal during a transmission interval (TTI) constituted by K frames, $K \geq 1$, said coding device comprising:

first distribution means for providing 4K data symbols belonging to a PPM (pulse position modulation) modulation alphabet or a composite PPM-PAM (pulse position modulation-pulse amplitude modulation) modulation alphabet including M time positions, to K coding modules in parallel, with each coding module corresponding to a frame and operating on said 4K data symbols to provide four transmission symbols;

second distribution means for providing each coding module with a set of 4K coefficients ($V^K, V_1^K$) belonging to a real algebraic extension of a field of rational numbers;

each coding module being adapted to perform a linear combination of said 4K data symbols with the 4K coefficients that it receives, and to perform a permutation of PPM components of one of the symbols obtained by combination; and a plurality of delay lines mounted in series, each applying a delay equal to a frame duration and receiving, at its input, an output of a coding module.

18. The coding device according to claim 17, wherein each coding module includes four calculation sub-modules, said first distribution means are adapted to provide a first half ($s_1, \ldots, s_K, s_{K+1}, \ldots, s_{2K}$) of said data symbols to a first and a fourth of said sub-modules and a second half ($s_{2K+1}, \ldots, s_{3K}, s_{3K+1}, \ldots, s_{4K}$) of said data symbols to a second and a third of said sub-modules, and said second distribution means are adapted to provide a first half of said coefficients ($V^k$) to the first and second sub-modules and a second half of the coefficients ($V_1^k$) to the third and fourth sub-modules; and the coding device further includes, a permutation sub-module adapted to perform a permutation of the PPM components of the symbols at an output of one of said calculation sub-modules; and a plurality of other delay lines mounted in series, each applying a delay equal to a duration of a transmission symbol and receiving, at its input, an output of one of said calculation sub-modules or an output of the permutation sub-module.

19. The coding device according to claim 18, wherein said permutation sub-module is also suitable for reversing a sign of one or more PPM components of the symbols that it receives.

20. The coding device according to claims 18 or 19, wherein each calculation sub-module includes multiplication means for respectively multiplying each of the 2K data symbols that it receives by a respective coefficient among the 2K coefficients that it receives, and summing means for summing the 2K symbols thus obtained.

* * * * *